United States Patent [19]

Shibata et al.

[11] Patent Number: 5,409,389
[45] Date of Patent: Apr. 25, 1995

[54] TRANSMISSION APPARATUS BETWEEN ROTATABLE BODY AND FIXED BODY

[75] Inventors: Masahiro Shibata, Chigasaki; Masahiro Hasegawa, Kameyama, both of Japan

[73] Assignee: Furukawa Electric Co., Ltd., Tokyo, Japan

[21] Appl. No.: 994,904

[22] Filed: Dec. 22, 1992

[30] Foreign Application Priority Data

Dec. 24, 1991 [JP] Japan .............................. 3-111556 U
Dec. 25, 1991 [JP] Japan .............................. 3-112052 U

[51] Int. Cl.6 .................................................. H01R 39/02
[52] U.S. Cl. ........................................ 439/164; 439/15
[58] Field of Search ................................. 439/15, 164

[56] References Cited

U.S. PATENT DOCUMENTS 3,763,455 12/1973 Confer et al. .
4,540,223 9/1985 Schmerda et al. .
5,082,451 1/1992 Bannai et al. ................... 439/15 X
5,127,841 7/1992 Bannai et al. ................... 439/164
5,224,871 7/1993 Ida et al. ........................ 439/164

FOREIGN PATENT DOCUMENTS 220001 5/1958 Australia .......................... 439/164
61-115751 6/1986 Japan .
62-168581 10/1987 Japan .

Primary Examiner—Eugene F. Desmond
Attorney, Agent, or Firm—Staas & Halsey

[57] ABSTRACT

Disclosed is a transmission apparatus comprising an outer casing, an inner casing relatively rotatable to the outer casing, a flexible cable of which one end is connected to the inside surface of the outer casing and the other end is connected to the outside surface of the inner casing, a guide ring having at part of its circumferential direction a cut-out portion, which is attached for sliding between the outer casing and the inner casing and a resilient portion provided with the guide ring, which presses the flexible cable against the inside surface of the outer casing or the outside surface of the inner casing. The flexible cable has a reversing portion through the cut-out portion of the guide ring to be wound in one direction around the outside surface of the inner casing and wound in the reverse direction between the guide ring and the outer casing.

9 Claims, 10 Drawing Sheets

TRANSMISSION APPARATUS BETWEEN ROTATABLE BODY AND FIXED BODY

BACKGROUND OF THE INVENTION

1. Field of the Invention

The present invention relates to a transmission apparatus used for transmitting electrical signals, optical signals, electric power, etc. between a rotatable body and a fixed body.

2. Description of the Related Art

In the prior art, when transmitting signals between, for example, an automobile steering wheel (rotatable body) and the steering column (fixed body), use has been made of the transmission apparatus such as shown in FIG. 1 and FIG. 2 (Japanese Unexamined Published Utility Model Application No. 62-168581).

This transmission apparatus has a tape-liked flexible cable 11 wound in a mainspring manner between an inner casing 13 and an outer casing 15. The inside end of the flexible cable 11 is affixed to a body portion 13a of the inner casing 13, where it is connected to a lead wire 17, while the outside end of the flexible cable 11 is affixed to a tubular portion 15a of the outer casing 15, where it is connected to another lead wire 19. The inner casing 13 and the outer casing 15 are assembled to be relatively rotatable.

Therefore, for example, if the inner casing 13 is attached to the rotatable body and the outer casing 15 is as attached to the fixed body, signals could be transmitted between the rotatable body and the fixed body in the range of winding and unwinding of the mainspring-like wound flexible cable 11. This type of transmission apparatus is limited in application to the case of reciprocal rotation of the rotatable body, but has no sliding contact portions for electrically connecting, so can constitute a highly reliable transmission route.

In this transmission apparatus, the number of possible relative rotations of the inner casing and the outer casing is determined by the number of turns of the flexible cable, so if desired to increase the number of possible rotations, it is necessary to increase the number of turns of the flexible cable (increase the length). If the number of turns of the flexible cable is increased, however, it becomes difficult to transmit the rotational force of the rotatable body side to the flexible cable as a whole, so, for example, trouble such as reversal and bending of the flexible cable would easily occur.

Therefore, to enable a reduction of the number of turns of the flexible cable, the transmission apparatus shown in FIG. 3 (Japanese Unexamined Published patent Application no. 61-115,751) is proposed. This transmission apparatus has an outer casing 15 and an inner casing 13. An inside end of a flexible cable is affixed at a body portion 13a of the inner casing. The outside end of the flexible cable 11 is affixed to the tubular body 15a of the outer casing. The inside end side of the flexible cable 11 is wound in one direction on the body portion 13a, and the outside end side of the flexible cable 11 is wound inside the tubular body 15a with a winding direction opposite to the inside end side, whereby a portion 11a where the winding direction reversed is provided at an intermediate portion of the flexible cable 11.

According to this apparatus, for example, in the case where the outer casing 15 is affixed and the inner casing 13 is turned in the clockwise direction, the reversing portion 11a of the flexible cable 11 also moves clockwise and the relative rotation of the two casings 13 and 15 is half canceled out, so it is possible to reduce the number of turns of the flexible cable 11 (shorten the length).

This apparatus, however, conversely from the above, suffers from the problem that when the inner casing 13 is rotated in the counterclockwise direction, slack would occur at the flexible cable 11 wound on the inner casing 13 and situations would easily occur where the reversing portion 11a would not move in the counterclockwise direction, so as a result a normal rotational operation is not possible. Therefore, this type of transmission apparatus has not in fact been commercialized.

U.S. Pat. Nos. 3,763,455 and 4,540,223 show electrically connecting apparatuses between a rotatable member and a fixed member, which have spacer means between the outer casing and the inner casing. In accordance with the apparatuses the spacer means can guide the movement of the flexible cable.

However, the apparatuses still have the possibility that the flexible cable can easily move in radial direction between the spacer means and the outside surface of the inner casing or the inside surface of the outer casing, so that the slack of the flexible cable would occur. The apparatuses have no means for pressing the flexible cable against the outside surface of the inner casing or the inside surface of the outer casing.

It is important for transmission apparatus used for automobile that the rotatable member can move easily.

SUMMARY OF THE INVENTION

An object of the present invention is to provide a transmission apparatus of the type with a portion where the winding direction reverses provided at an intermediate portion of the flexible cable, wherein it is possible to reliably prevent the occurrence of trouble caused by slack in the flexible cable.

The present invention, to achieve the above-mentioned object, provides a first transmission apparatus comprising an outer casing, an inner casing relatively rotatable to the outer casing, a flexible cable of which one end is connected to the inside surface of the outer casing and the other end is connected to the outside surface of the inner casing, a guide ring having at part of its circumferential direction a cut-out portion, which is attached for sliding between the outer casing and the inner casing and a resilient portion attached to the guide ring, which pushes the flexible cable against the inside surface of the outer casing or the outside surface of the inner casing, the flexible cable having a reversing portion through the cut-out portion of the guide ring to be wound in one direction around the outside surface of the inner casing and wound in the reverse direction between the guide ring and the outer casing.

According to the first transmission apparatus of the invention, the occurrence of slack in the flexible cable is prevented by the guide ring, the reversing portion of the flexible cable moves reliably by the rotation of the inner casing or the outer casing, and the guide ring turns along with the movement of the reversing portion of the flexible cable. Therefore, it is possible to eliminate the occurrence of trouble due to slack in the flexible cable.

Note that to more reliably prevent slack in the flexible cable, it is effective to provide the guide ring with elastic bodies pressing the flexible cable against at least the outside surface or the inside surface of the inner casing or the outer casing. And it is preferable to provide a sliding resistance reducing layer on the surface of the flexible cable so as to slide between turns of the flexible cable.

Further, the present invention provide a second transmission apparatus comprising an outer casing, an inner casing relatively rotatable to the outer casing, a flexible cable of which one end is connected to the inside surface of the outer casing and the other end is connected to the outside surface of the inner casing, and a sprocket formed on the outside surface of the inner casing or the inside surface of the outer casing, which engages with a sprocket hole formed in the flexible cable, the flexible cable having a reversing portion to be wound in one direction around the outside of the inner casing and wound in the reverse direction around the inside of the outer casing.

In accordance with the second transmission apparatus, the engagement between the sprocket formed at the inner casing or the outer casing and the sprocket holes formed in the flexible cable enables the rotation of the inner casing or the outer casing serving as the rotatable body to be reliably transmitted to the flexible cable and slack in the flexible cable to be prevented. Therefore, the reversing portion of the flexible cable moves reliably by the rotation of the inner casing or the outer casing and it is possible to eliminate the occurrence of trouble due to slack in the flexible cable.

Note that to more reliably prevent slack in the flexible cable, it is effective to [1] provide a guide ring having at part of its circumferential direction a cut-out portion through which the portion of the flexible cable where the winding direction reverses passes between the inside end side of the flexible cable wound around the body portion and the outside end side of the flexible cable wound at the inside of the tubular portion, [2] provide the guide ring with elastic bodies pressing the flexible cable against the body portion or the tubular portion, or [3] provide a sliding layer on the surface of the flexible cable so as to slide between turns of the flexible cable.

In accordance with the present invention, it is possible to reliably prevent trouble caused by slack in the flexible cable in a transmission apparatus of the type having a portion where the winding direction reverses at an intermediate portion of the flexible cable, so it is possible to obtain a transmission apparatus with a short length of the flexible cable and stable operation (or a large number of possible rotations of the rotatable body in proportion to the length of the flexible cable).

BRIEF DESCRIPTION OF THE DRAWINGS

Other objects and features of the present invention will be described in detail with reference to accompanying drawings, in which.

DESCRIPTION OF THE PREFERRED EMBODIMENTS

Below, an explanation will be made of a first embodiment of the present invention with reference to the drawings.

Figure 1:
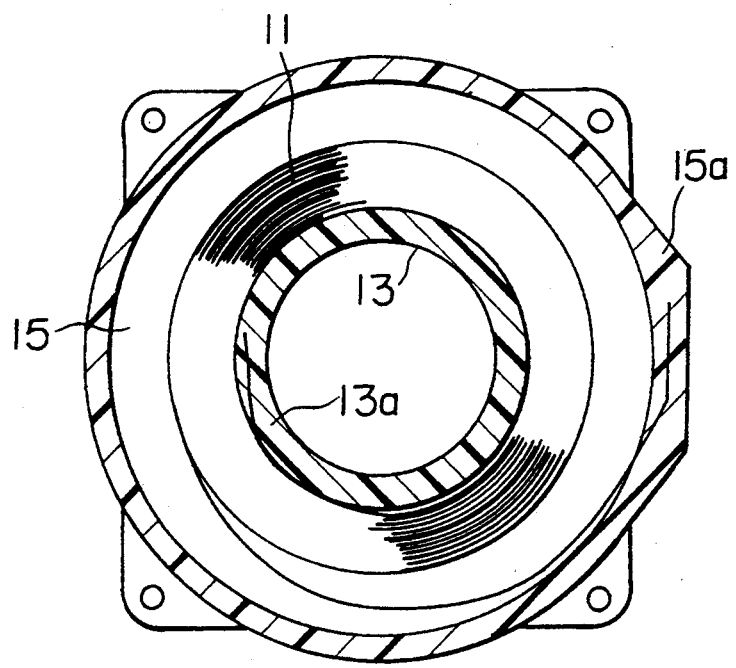
FIG. 1 is a lateral sectional view of a conventional transmission apparatus.
Figure 2:
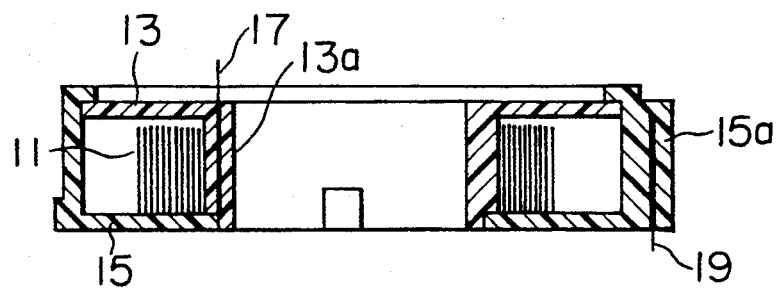
FIG. 2 is a longitudinal sectional view of the transmission apparatus of FIG. 1.
Figure 3:
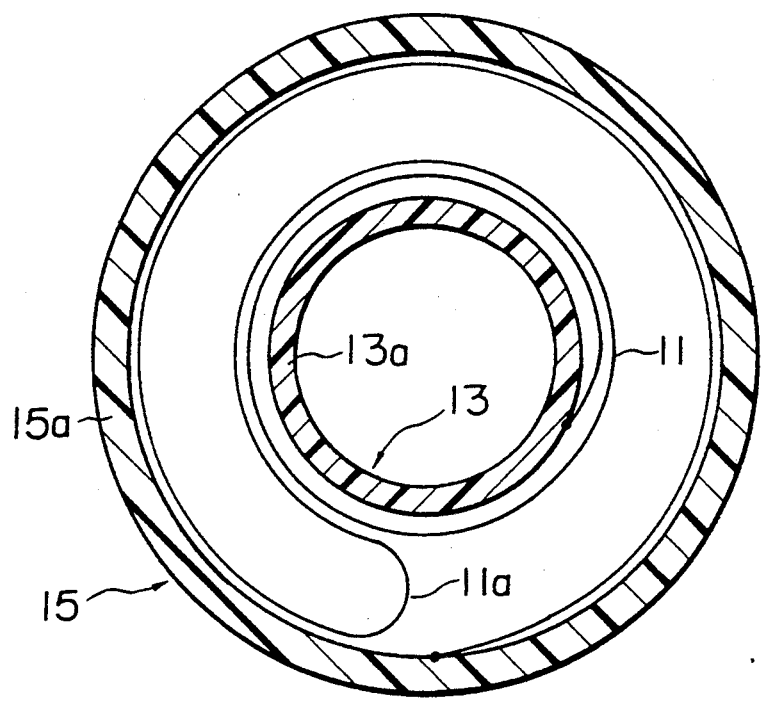
FIG. 3 is a lateral sectional view of a transmission apparatus of the type having a portion where the winding direction reverses at an intermediate portion of the flexible cable.
Figure 4:
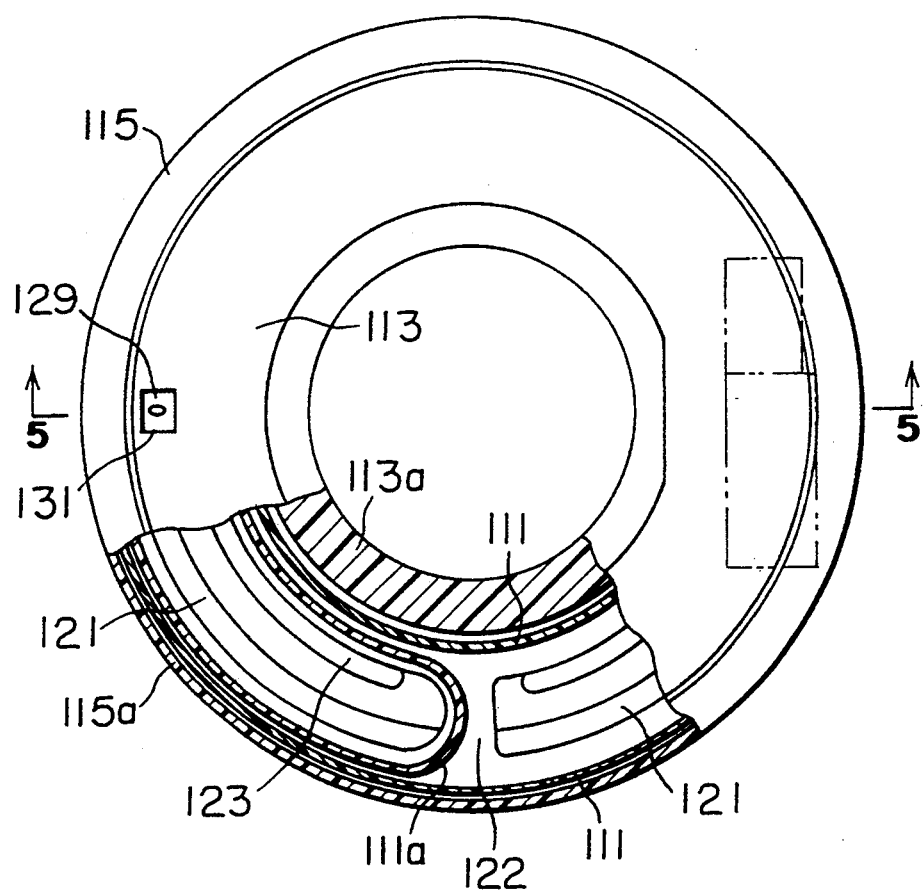
FIG. 4 is a partially cut-out plane view showing an embodiment of the transmission apparatus according to the present invention.
Figure 5:
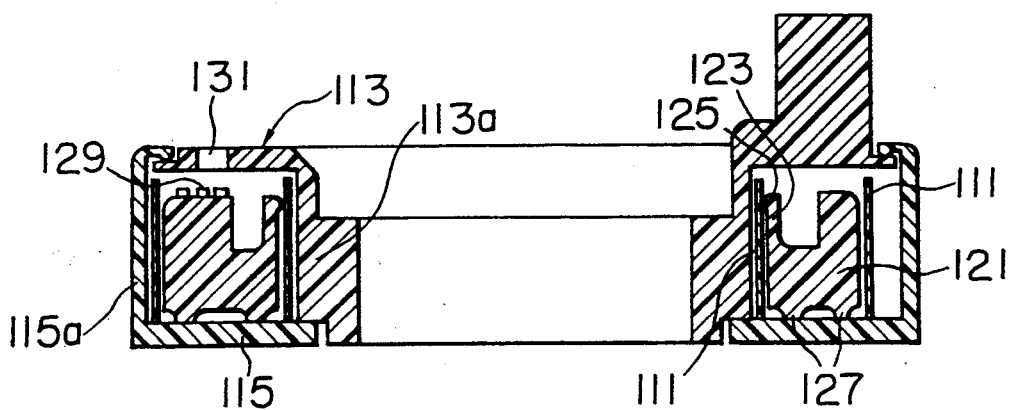
FIG. 5 is a sectional view taken along line A—A in FIG. 4.

FIG. 4 and FIG. 5 show a first embodiment of the present invention. This transmission apparatus comprises an outer casing 115, an inner casing 113 and a flexible cable 111. The inside end of the flexible cable 111 affixed to a body portion 113a of the inner casing 113. The outside end of the flexible cable 111 affixed to the tubular portion 115a of the outer casing 115. The inside end side of the flexible cable 111 wound in one direction on the body portion 113a and the outside end side of the flexible cable 111 wound inside the tubular portion 115a with a winding direction opposite to the inside side. The flexible cable has a portion 111a where the winding direction reverses.

The guide ring 121 has at part of its circumferential direction a cut-out portion 122 through which the portion 111a of the flexible cable where the winding direction reverses passes. The flexible cable is so arranged that the inside end side of the flexible cable 111 is wound around the body portion 113a and the outside end side of the flexible cable 111 is wound at the inside of the tubular portion 115a.

The guide ring 121 has elastic portions 123 as a resilient portion formed on its inside circumference. Inward facing projections 125 of the elastic portions 123 lightly press the flexible cable 111 against the body portion 113a. Further, projections 127 are formed on the surface of the guide ring 121 contacting the outer casing 115, by which the friction with the outer casing 115 is reduced. The guide ring 121 is preferably made of synthetic resin of high ability of slide, for example fluororesin.

Further, a portion 129 indicating the center position of the range of rotation of the inner casing 113 (the rotatable body in this case) is provided at a predetermined position of the guide ring 121, and a window 131 is provided at a predetermined position in the inner casing 113 for checking that indicating portion 129.

Next, the operation of the apparatus will be explained. Here, the explanation will be made of the case where the outer casing 115 is fixed and the inner casing 113 is reciprocatively rotated. First, if the inner casing 113 is turned in the clockwise direction in FIG. 4, the flexible cable 111 is wound up on the body portion 113a, so the reversing portion 111a of the flexible cable moves in the clockwise direction (the flexible cable 111 is unwound from the inside of the tubular portion 115a). The guide ring 121 rotates in the clockwise direction along with this. There was no particular problem with rotation in this direction in the prior art either.

Next, if the flexible cable 113 is turned in the counterclockwise direction in FIG. 4, the flexible cable 111 would normally be played out from the body portion 113a, but the flexible cable 111 wound on the body portion 113a is constrained at its outer circumference because the inward facing projections 125 of the elastic portions 123 of the guide ring 121 lightly press the flexible cable against the body portion 113a. Accordingly there is no leeway for occurrence of large slack and in the end it passes through the cut-out portion 122 of the guide ring 21 and is sent to the outer circumference side, so the reversing portion 111a of the flexible cable also moves in the counterclockwise direction. The guide ring 121 rotates in the counterclockwise direction along with the movement of the flexible cable 111.

Therefore, it is possible to make the inner casing 113 turn reciprocatively without causing slack in the flexible cable 111 and it is possible to prevent the occurrence of trouble caused by slack in the flexible cable.

Further, when the inner casing 113 turns, the guide ring 121 turns maintaining a substantially constant relationship with it, so by forming the indicating portion 129 of the guide ring 121 and the window 131 of the inner casing 113 so that the indicating portion 129 comes into the window 131 when the inner casing 113 reaches the center portion of the range of reciprocal rotation, it is possible to check if the inner casing 113 is at the center position of the range of reciprocal rotation at times when the transmission apparatus is mounted in an automobile etc.

Figure 6:
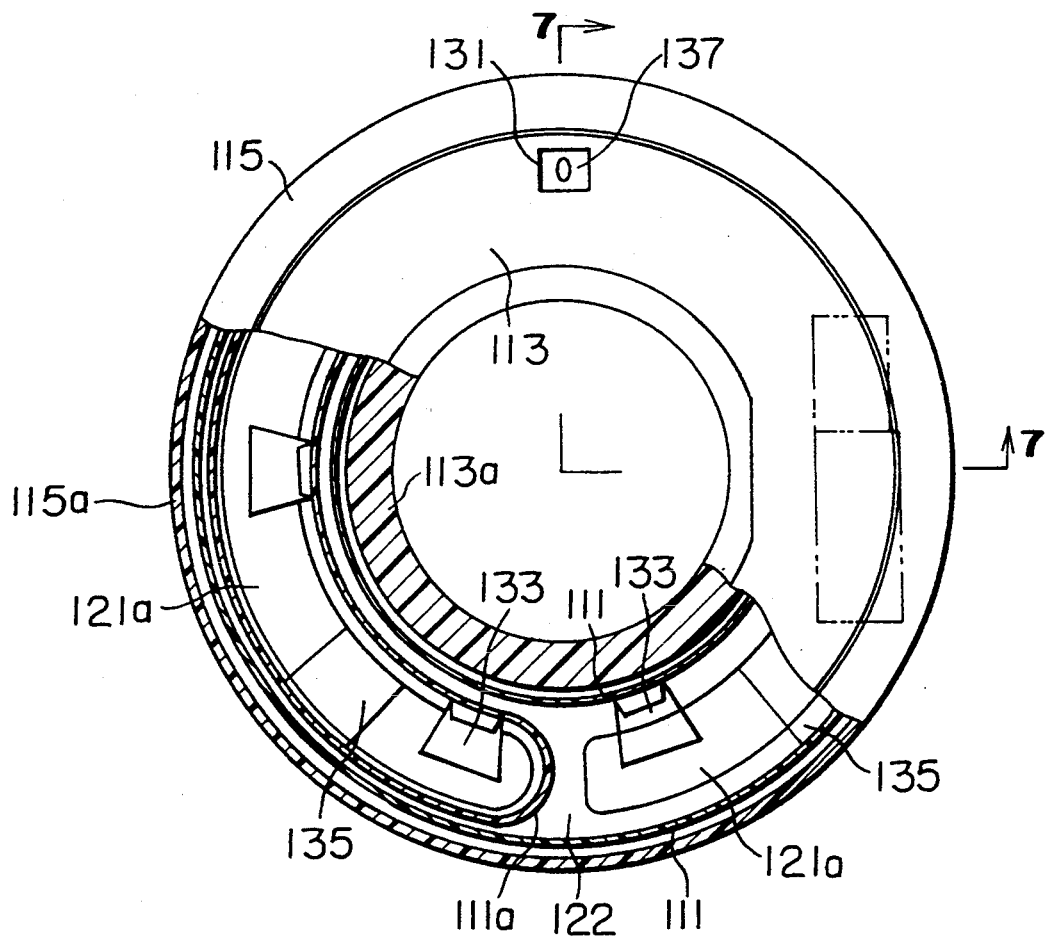
FIG. 6 is a partially cut-out plane view showing another embodiment of the transmission apparatus according to the present invention.
Figure 7:
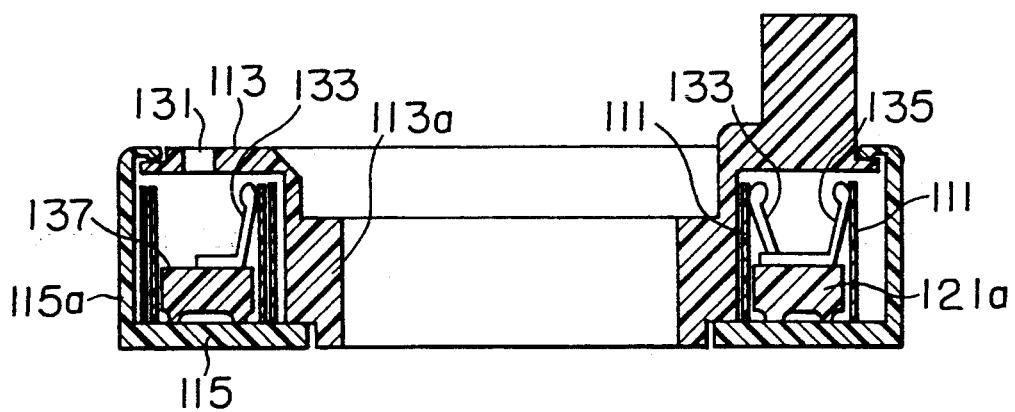
FIG. 7 is a sectional view taken along line B—B of FIG. 6.

Next, an explanation will be made of a second embodiment of the present invention referring to FIG. 6 to FIG. 8. Portions in FIG. 6 to FIG. 8 which are the same as in FIG. 4 and FIG. 5 previously explained are given the same reference numerals. In this transmission apparatus, a guide ring 121a is constructed having spring members 133 pressing the inside end side of the flexible cable 111 against the body portion 113a and spring members 135 pressing the outside end side of the flexible cable 111 against the tubular portion 115a. These spring members 133 and 135 are provided intermittently at suitable intervals in the circumferential direction.

Figure 8:
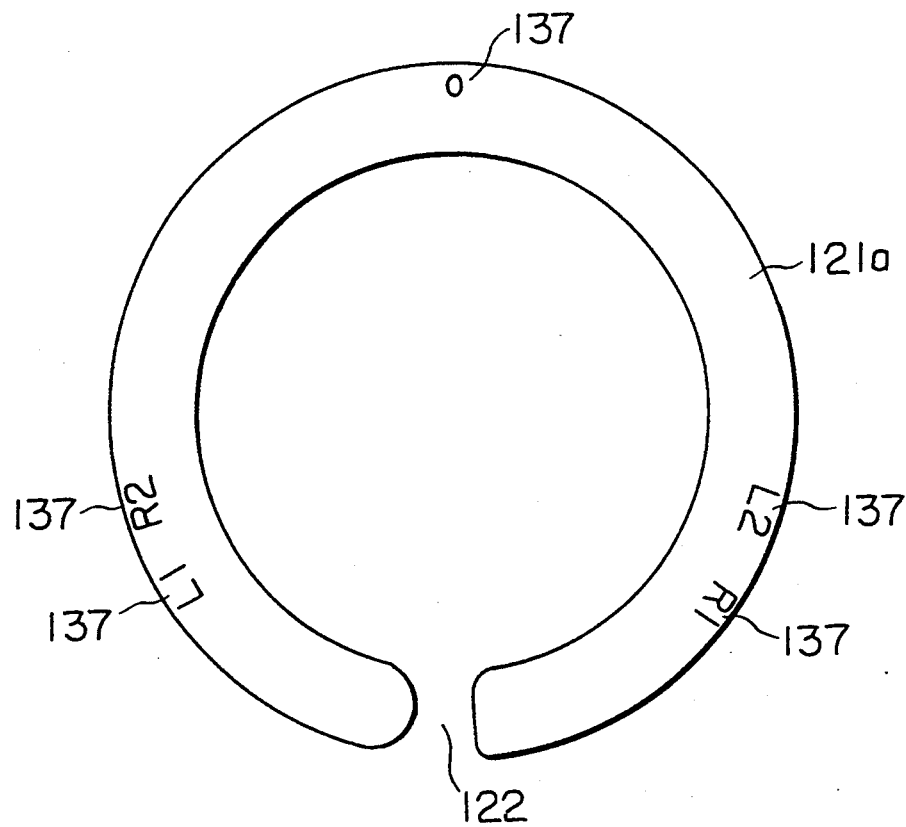
FIG. 8 is a plane view of a guide ring in the transmission apparatus of FIG. 6.

Further, the guide ring 121 is provided with a portion 137 indicating the number of rotations from the center position of the range of rotation of the inner casing 113 (rotatable body), as shown in FIG. 8. The provision of a window 131 for checking the indicating portion 137 at a predetermined position of the inner casing 113 is the same as in previous. When the inner casing 113 turns, the guide ring 121a turns in the same direction by a number of rotations a certain approximate rate less than that number of rotations, so by providing the rotation indicating portion 137 and the window 131, it is possible to check the number of rotations of the inner casing 113.

The rest of the construction is the same as in the first embodiment.

Figure 9:
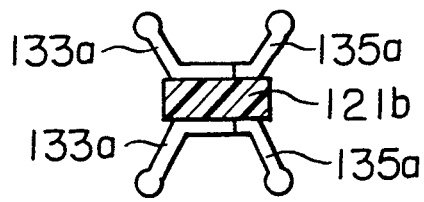
FIG. 9 is a sectional view showing another example of a guide ring used in the present invention.

In the above second embodiment, the spring members 133 and 135 were provided only on the top surface of the guide ring 121, but as shown in FIG. 9, it is also possible to provide spring members 133a and 135a on both the top and bottom surfaces of a guide ring 121b.

Figure 10:
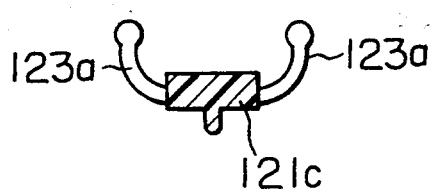
FIG. 10 is a sectional view showing another example of a guide ring used in the present invention.

Further, in the above first embodiment, the elastic portions 23 were provided only on the inside circumference of the guide ring 121b, but the elastic portions 123a may be provided on both the inside circumference and outside circumference of a guide ring 121c as shown in FIG. 10.

Figure 11:
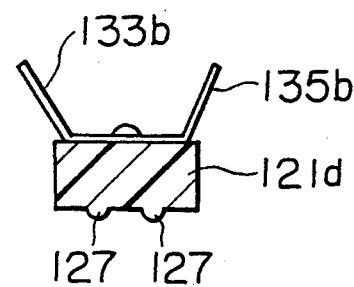
FIG. 11 is a sectional view showing still another example of a guide ring used in the present invention.

Further, as shown in FIG. 11, spring members 133b and 135b may be formed by leaf spring made of synthetic resin or metal and are attached to a guide ring 121d by means of rivet.

Figure 12:
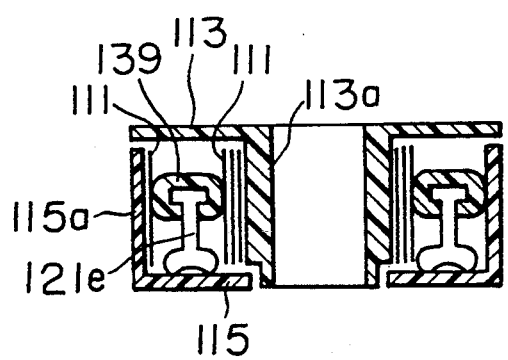
FIG. 12 is a sectional view showing still another embodiment of the transmission apparatus according to the present invention.

Next, an explanation will be made of a third embodiment of the present invention referring to FIG. 12. This transmission apparatus differs the previous embodiments in the point that a guide ring 121e is constructed having elastic block 139 pressing the inside end side of the flexible cable 111 against the body portion 113a and the outside end side against the tubular portion 115a. The elastic block 139 is, for example, comprised of a plastic foam etc. having a cushioning ability. The rest of the construction is the same as in the above embodiments.

Figure 13:
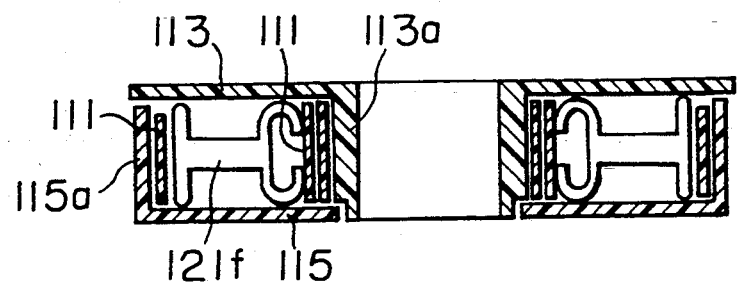
FIG. 13 is a sectional view showing still another embodiment of the transmission apparatus according to the present invention.

Next, an explanation will be made of a fourth embodiment of the present invention referring to FIG. 13. This transmission apparatus differs from the above embodiments in the construction of a guide ring 121f. The guide ring 121f has a cross-sectional shape where the inside circumference has a C-shape and the outside circumference has a T-shape. The elasticity of the C-shaped portion of the inside circumference presses the inside end side of the flexible cable 111 against the body portion 113a and the outside end side against the tubular portion 115a. The rest of the construction is the same as in the above embodiments.

In the above embodiments, the explanation was made using the inner casing 113 as the rotatable body and the outer casing 115 as the fixed body, but the transmission apparatus of the present invention may conversely have the inner casing 113 as the fixed body and the outer casing 115 as the rotatable body. In this case, the guide ring is preferably provided with elastic bodies pressing the flexible cable at least against the tubular portion of the outer casing.

Further, in the above embodiments, a sliding resistance reducing layer may be provided on the surface of the flexible cable so as to prevent the slack in the flexible cable. For this sliding resistance reducing layer, it is possible to coat a lubricant on the cable or cover the cable with a tape of high sliding capability. If such a sliding resistance reducing layer is provided, there is no longer any slack of the flexible cable.

Figure 14:
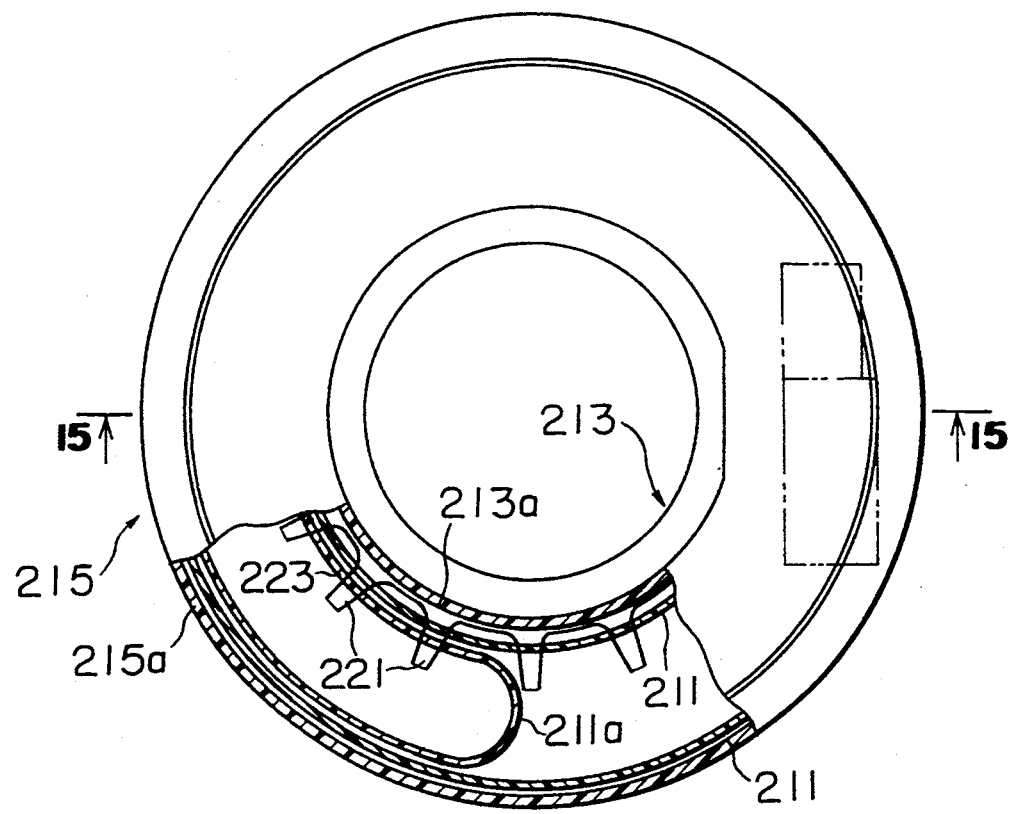
FIG. 14 is a partially cut-out plane view showing still another embodiment of the transmission apparatus according to the present invention.
Figure 15:
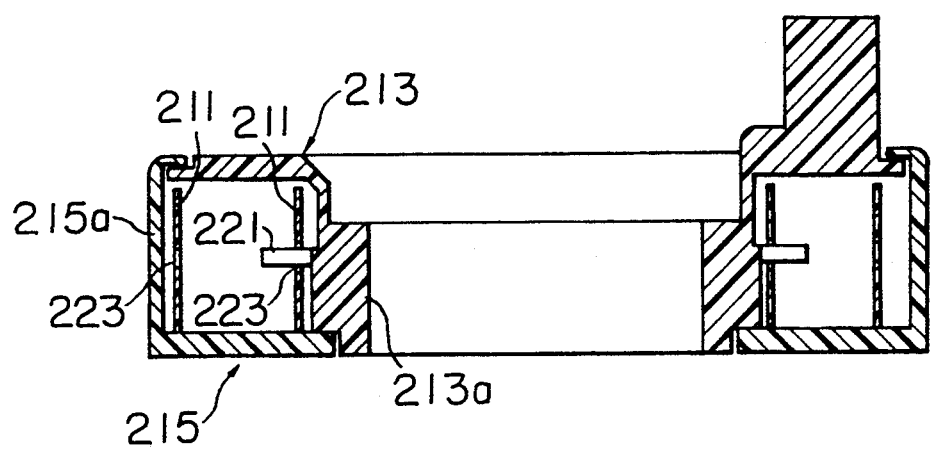
FIG. 15 is a sectional view taken along line A—A in FIG. 14.

FIG. 14 and FIG. 15 show still another embodiment of the present invention. This transmission apparatus comprises an outer casing 215, an inner casing 213 and a flexible cable 211. The inside end of the flexible cable 211 affixed to the body portion 213a of the inner casing 213. The outside end of the flexible cable 211 affixed to the tubular portion 215a of the outer casing 215. The inside end side of the flexible cable 211 wound in one direction on the body portion 213a and the outside end side of the flexible cable 211 wound inside the tubular portion 215a with a winding direction opposite to the inside side. The flexible cable has a portion 211a where the winding direction reverses.

A sprocket 221 is formed at the outer circumference of the body portion 213a of the inner casing 213. Sprocket holes 223 engaging with the sprocket 221 are formed in the flexible cable 211.

Next, the operation of this apparatus will be explained. In this transmission apparatus, the inner casing 213 is the rotatable body and the outer casing 215 is the fixed body. First, if the inner casing 213 is turned in the clockwise direction in FIG. 14, the flexible cable 211 is wound up on the body portion 213a (at this time, the sprocket holes 223 of the reversing portion 211a engage with the sprocket 221), so the reversing portion 211a of the flexible cable moves in the clockwise direction while the flexible cable 211 is unwound from the inside of the tubular portion 215a. There was no particular problem with rotation in this direction in the prior art either.

Next, if the flexible cable 213 is turned in the counterclockwise direction in FIG. 14, the flexible cable 211 wound on the body portion 213a engages with the sprocket 221 at the sprocket holes 223, so no slack occurs and it turns along with the body portion 213a until it is finally pulled off from the body portion 213a at the reversing portion 211a (detached from the sprocket 221), so the reversing portion 211 of the flexible cable also moves reliably in the counterclockwise direction.

Therefore, it is possible to make the inner casing 213 turn reciprocatively without causing slack in the flexible cable 211 and it is possible to prevent the occurrence of trouble caused by slack in the flexible cable.

Next, an explanation will be made of a second embodiment of the present invention referring to FIG. 16 and FIG. 17. In this transmission apparatus, a guide ring 225 has at part of its circumferential direction a cut-out portion 226 through which the portion 211a of the flexible cable where the winding direction reverses passes. The flexible cable 211 is so arranged that the inside end side of the flexible cable 211 is wound around the body portion 213a and the outside end side of the flexible cable 211 is wound at the inside of the tubular portion 215a.

Further, a portion 229 indicating the center position of the range of rotation of the inner casing 213 is provided at a predetermined position of the guide ring 225, and a window 231 is provided at a predetermined position in the inner casing 213 for checking that indicating portion 229.

The rest of the construction is the same as in the embodiment shown in FIGS. 14 and 15, so the same reference numerals are given to the same portions and explanations thereof are omitted.

The operation of the apparatus is as follows. The reciprocal rotation of the inner casing 213 causes movement of the reversing portion 211a of the flexible cable in the same way as in the embodiment shown in FIGS. 14 and 15, but in this transmission apparatus, when the reversing portion 211a of the flexible cable moves, the guide ring 225 moves along with it in the same direction. The guide ring 225 presses the flexible cable 211 wound on the body portion 213a from the outer circumference of the same, so there is no detachment of the sprocket holes 223 of the flexible cable 211 from the sprocket 221 and the operation becomes more reliable.

Further, when the inner casing 213 turns, the guide ring 225 turns maintaining a substantially constant relationship with it, so by forming the indicating portion 229 of the guide ring 225 and the window 231 of the inner casing 213 so that the indicating portion 229 comes into the window 231 when the inner casing 213 reaches the center portion of the range of reciprocal rotation, it is possible to check if the inner casing 213 is at the center position of the range of reciprocal rotation at times when the transmission apparatus is mounted in an automobile etc.

Next, an explanation will be made of still another embodiment of the present invention referring to FIG. 18 and FIG. 19. In this transmission apparatus, a guide ring 225a is constructed having elastic portions 233 pressing the flexible cable 211 wound at the inside of the tubular portion 215a against the tubular portion 215a. The elastic portions 233 are provided intermittently at suitable intervals in the circumferential direction and prevent the occurrence of slack in the flexible cable 211 at the inside of the tubular portion 215a.

Figure 17:
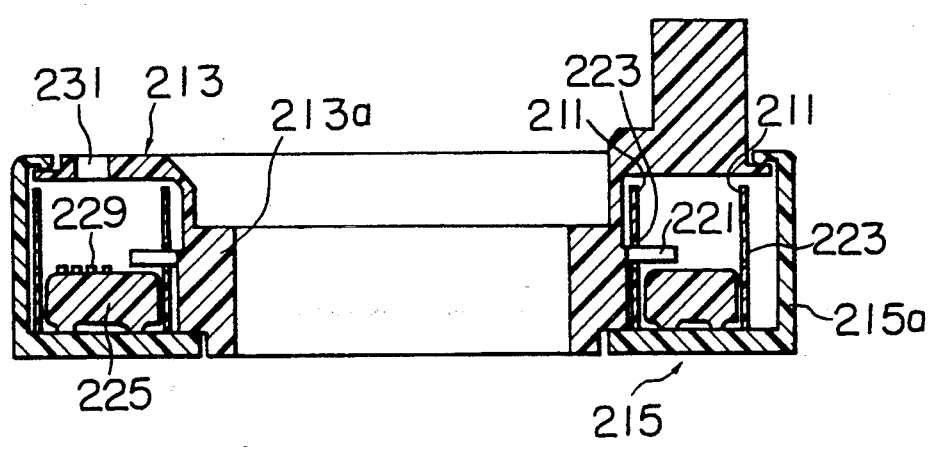
FIG. 17 is a sectional view taken along line B—B of FIG. 16.
Figure 18:
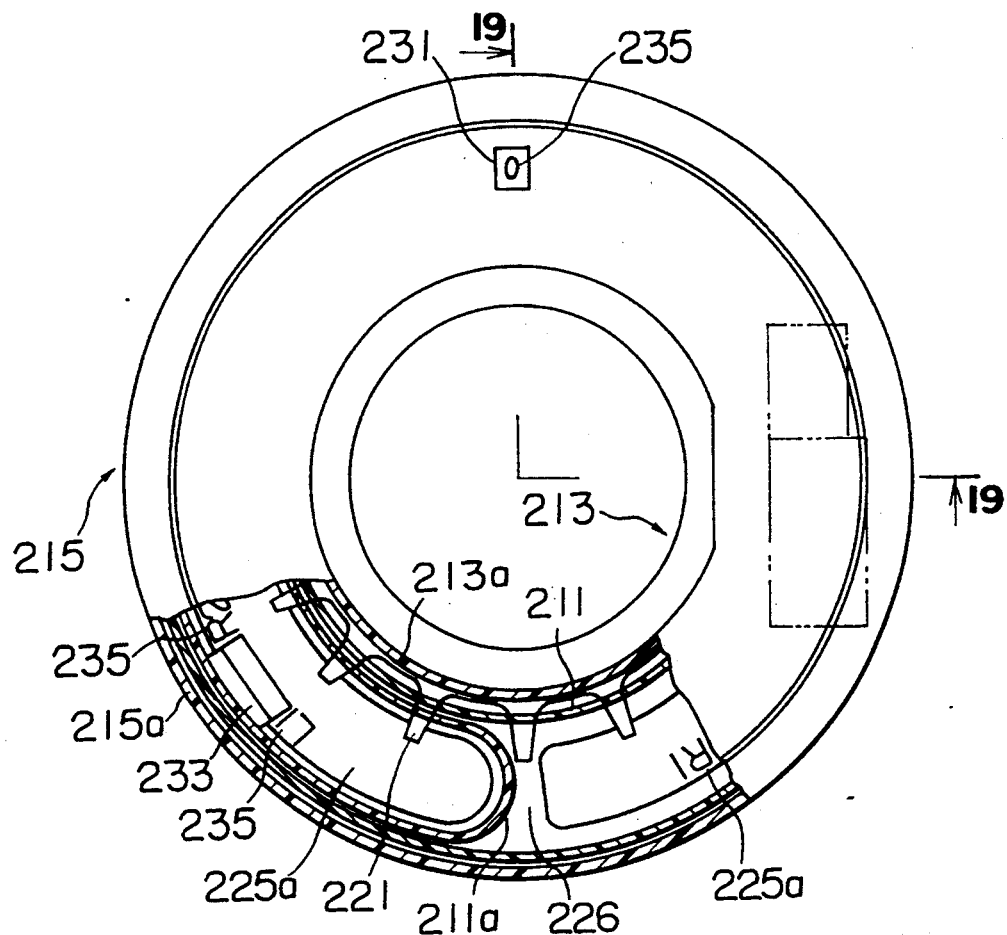
FIG. 18 is a partially cut-out plane view showing still another embodiment of the transmission apparatus according to the present invention.

Further, the guide ring 225a is provided with a portion 235 indicating the number of rotations from the center position of the range of rotation of the inner casing 213, as shown in FIG. 18. Note that the provision of a window 231 for checking the indicating portion 235 at a predetermined position of the inner casing 213 is the same as in the embodiment shown in FIGS. 16 and 17. When the inner casing 213 turns, the guide ring 225a turns in the same direction by a number of rotations a certain approximate rate less than that number of rotations, so by providing the rotation indicating portion 235 and the window 231, it is possible to check the number of rotations of the inner casing 213.

Figure 16:
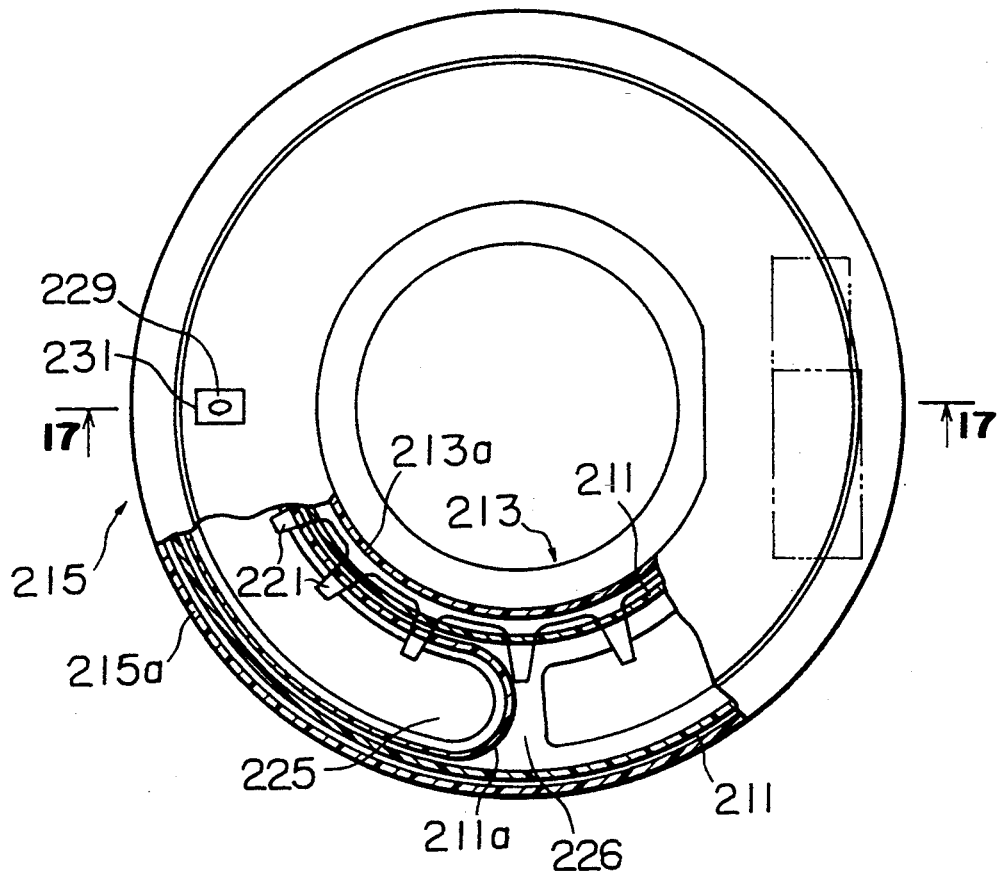
FIG. 16 is a partially cut-out plane view showing still another embodiment of the transmission apparatus according to the present invention.

The rest of the construction is the same as in the embodiment shown in FIGS. 16 and 17, so the same portions are given the same reference numerals and explanations thereof are omitted..

Figure 20:
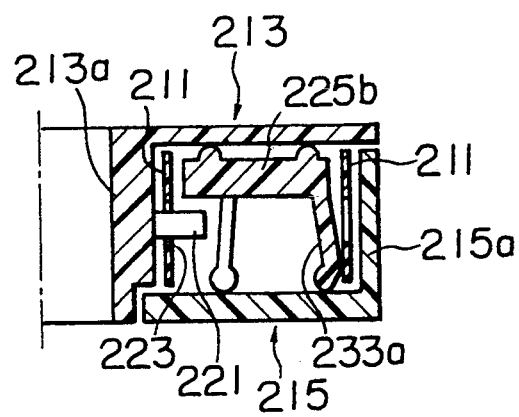
FIG. 20 is a sectional view showing still another embodiment of the transmission apparatus according to the present invention.

In the above embodiment, the elastic portions 233 are provided on the top surface of the guide ring 225a, but as shown in FIG. 20, it is also possible to arrange a guide ring 225b on the top side of the sprocket 221 and provide the elastic portions 233a at the bottom surface of the guide ring 225a.

Figure 21:
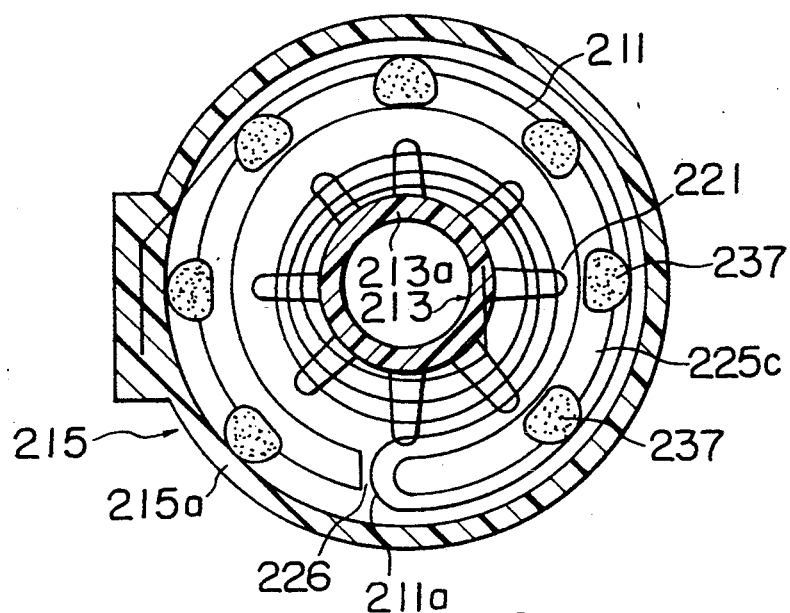
FIG. 21 is a lateral sectional view showing still another embodiment of the transmission apparatus according to the present invention.
Figure 22:
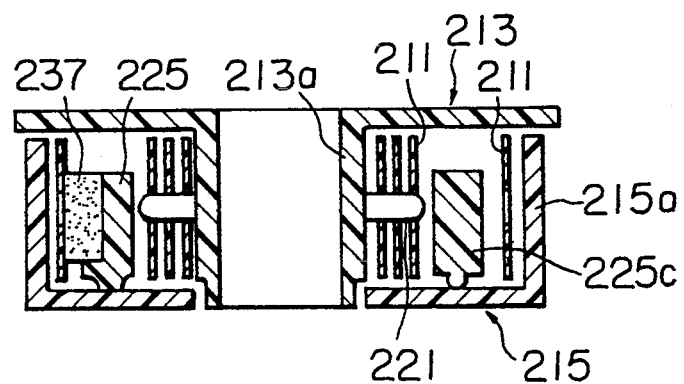
FIG. 22 is a longitudinal sectional view of the transmission apparatus of FIG. 21.

Next, an explanation will be made of still another embodiment of the present invention referring to FIG. 21 and FIG. 22. In this transmission apparatus, a guide ring 225c is constructed having elastic members 237 pressing the outside end side of the flexible cable 211 against the tubular portion 215a. The elastic members 237 are, for example, comprised of a plastic foam etc. having a cushioning ability. In the case of this structure, it is possible to provide a portion indicating the rotation number at the top end surface of the elastic members 237.

Figure 19:
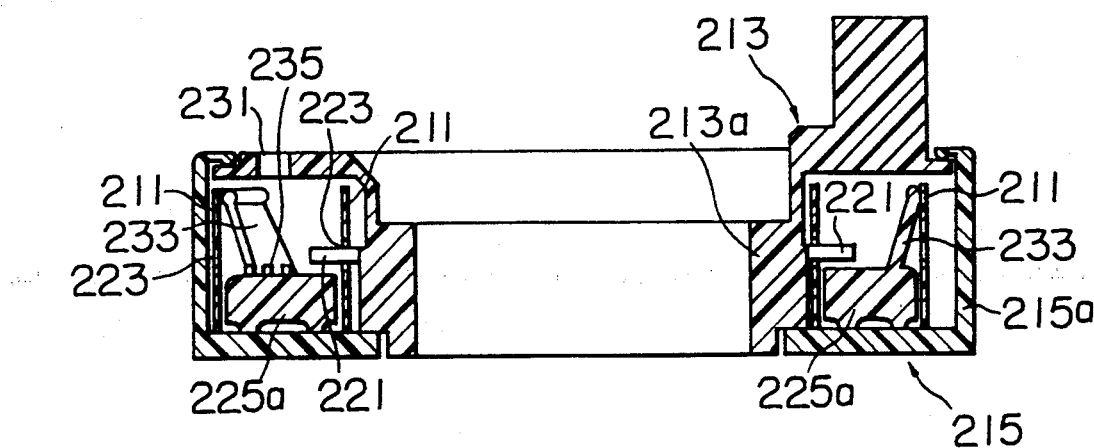
FIG. 19 is a sectional view taken along line C—C of FIG. 18.

The rest of the construction is the same as in the embodiment shown in FIGS. 18 and 19, so the same portions are given the same reference numerals and explanations thereof are omitted.

In the above embodiments, the explanation was made using the inner casing 213 as the rotatable body and the outer casing 215 as the fixed body, but the transmission apparatus of the present invention may conversely have the inner casing 213 as the fixed body and the outer casing 215 as the rotatable body. In this case, the sprocket is formed at the inside surface of the tubular portion of the outer casing.

Further, in the above embodiments, a sliding layer may be provided on the surface of the flexible cable so as to eliminate the slack in the flexible cable. If this sliding layer is provided, there is no longer any slack of the flexible cable.

Further, if the interval of the sprocket teeth is made wider than the interval of the sprocket holes of the flexible cable and the sprocket teeth engaged with for every several sprocket holes, the winding ability of the flexible cable becomes more stable.

Many widely different embodiments of the present invention may be constructed without departing from the spirit and scope of the present invention, and it should be understood that the present invention is not restricted to the specific embodiments described above.

We claim:

1. A transmission apparatus between a rotatable body and a fixed body comprising:
   an outer casing;
   an inner casing relatively rotatable to the outer casing;
   a flexible cable of which one end is connected to the inside surface of the outer casing and the other end is connected to the outside surface of the inner casing; and
   a sprocket formed on the outside surface of the inner casing or the inside surface of the outer casing, which engages with a sprocket hole formed in the flexible cable,
   said flexible cable having a reversing portion to be wound in one direction around the outside of the inner casing and wound in the reverse direction around the inside of the outer casing.

2. A transmission apparatus between a rotatable body and a fixed body comprising:
   an outer casing;
   an inner casing relatively rotatable to the outer casing;
   a flexible cable of which one end is connected to the inside surface of the outer casing and the other end is connected to the outside surface of the inner casing;
   a sprocket formed on the outside surface of the inner casing or the inside surface of the outer casing, which engages with a sprocket hole formed in the flexible cable; and
   a guide ring having at part of its circumferential direction a cut-out portion, which is attached for sliding between the outer casing and the inner casing,
   said flexible cable having a reversing portion through the cut-out portion to be wound in one direction around the outside of the inner casing and wound in the reverse direction around the inside of the outer casing.

3. The transmission apparatus as set forth in a claim 2, further comprising a resilient portion provided with the guide ring, which presses the flexible cable against the inside surface of the outer casing or the outside surface of the inner casing.

4. The transmission apparatus as set forth in claim 3, wherein the guide ring has elastic bodies integrally provided with the resilient portion.

5. The transmission apparatus as set forth in claim 2, wherein a portion indicating the center position of the range of reciprocal rotation between the outer casing and the inner casing is provided on the guide ring and a window is provided in the inner casing or the outer casing for checking that indicating portion.

6. The transmission apparatus as set forth in claim 2, wherein portions indicating the number of rotations of the rotatable body is provided at the guide ring and a window is provided in the inner casing or the outer casing for checking that indicating portion.

7. The transmission apparatus as set forth in claim 3, wherein the resilient portion is comprised of a leaf spring attached to the guide ring.

8. The transmission apparatus as set forth in claim 2, wherein a sliding resistance reducing layer is provided on the surface of the flexible cable.

9. The transmission apparatus as set forth in claim 2, wherein the flexible cable has tape-like shape.

* * * * *